United States Patent
Rixen et al.

(10) Patent No.: US 8,747,016 B2
(45) Date of Patent: Jun. 10, 2014

(54) PROFILE BAR CONNECTION SYSTEM

(76) Inventors: Wolfgang Rixen, Solingen (DE); Gerrit Pies, Solingen (DE)

( * ) Notice: Subject to any disclaimer, the term of this patent is extended or adjusted under 35 U.S.C. 154(b) by 100 days.

(21) Appl. No.: 13/379,006

(22) PCT Filed: May 20, 2010

(86) PCT No.: PCT/EP2010/003109
§ 371 (c)(1),
(2), (4) Date: Dec. 17, 2011

(87) PCT Pub. No.: WO2010/145744
PCT Pub. Date: Dec. 23, 2010

(65) Prior Publication Data
US 2012/0087719 A1    Apr. 12, 2012

(30) Foreign Application Priority Data
Jun. 18, 2009    (DE) .................... 20 2009 008 687 U (51) Int. Cl.
*F16B 7/04*    (2006.01)
(52) U.S. Cl.
USPC .......................... 403/398; 403/385; 403/400
(58) Field of Classification Search
USPC ......... 403/235, 236, 385, 386, 387, 398, 400,
403/187, 192, 199, 230, 241, 169, 170, 171,
403/176
See application file for complete search history.

(56) References Cited

U.S. PATENT DOCUMENTS

| | | | | |
|---|---|---|---|---|
| 3,069,189 A | * | 12/1962 | Hollaender | 403/385 |
| 3,820,909 A | | 6/1974 | Schindler et al. | |
| 4,493,172 A | * | 1/1985 | Jones | 52/282.2 |
| 4,656,952 A | * | 4/1987 | Schweizer | 108/11 |
| 4,907,907 A | * | 3/1990 | Kreusel | 403/171 |
| 4,915,535 A | * | 4/1990 | Willetts | 403/191 |
| 5,575,580 A | * | 11/1996 | Parrish et al. | 403/230 |
| 6,257,792 B1 | * | 7/2001 | Read, Jr. | 403/344 |
| 6,505,453 B1 | | 1/2003 | Rixen et al. | |
| 6,553,738 B1 | | 4/2003 | Rixen et al. | |
| 2008/0232899 A1 | * | 9/2008 | Berg | 403/359.6 |

FOREIGN PATENT DOCUMENTS

| | | |
|---|---|---|
| DE | 24 00 747 A1 | 7/1975 |
| DE | 19855928 A1 | 6/2000 |
| GB | 177 271 A | 3/1922 |

* cited by examiner

*Primary Examiner* — Michael P Ferguson
(74) *Attorney, Agent, or Firm* — Gudrun E. Huckett (57) ABSTRACT

The invention relates to a profile bar connection system (10) for connecting at least two profile bars (12, 14) extending approximately perpendicular to each other, having first and second clamp halves (16, 18) that can be connected to each other at the first ends (16a, 18a) and second ends (16b, 18b) thereof, and having a clamping device (20) that can be connected to the first and second clamp halves placed about the first profile bar (12) and holding the second profile bar. In order to produce a profile bar connection system so that the assembly thereof can be performed substantially more simply and safely, said system is implemented such that the first ends (16a, 18a) are interlocked with each other, and the second ends (16b, 18b) are connected to each other by means of the clamping device (20).

7 Claims, 7 Drawing Sheets

PROFILE BAR CONNECTION SYSTEM

BACKGROUND OF THE INVENTION

The invention concerns a profile bar connection system for connecting at least two first and second profile bars extending approximately perpendicularly to each other, with first and second clamp halves that are connectable to each other at their first ends and second ends, a clamping device that is connectable to the first and second clamp halves, placed about the first profile bar, and that holds the second profile bar.

Such a profile bar connection system is disclosed, for example, In DE-OS 2 400 747. Here, the two clamp halves that have flanges at their ends are connected by means of these flanges by means of screw connection with each other.

In this context, one of the two clamp halves has a dovetail-shaped projection across which a clamping device is pushed. This clamping device is substantially C-shaped in cross-section wherein the respective ends engage the dovetail undercut of the projection of the clamp. In order for this damping member to be additionally secured by means of a force, a screw is passed through the two short ends of the C-shaped profile of the clamping member. This screw secures also the second profile bar that has been pushed across the short ends of the C-shaped clamping member and through which the screw passes.

This known profile bar connection system is however of a highly complex configuration and requires therefore several working steps in order to ensure proper positioning and proper fit of these clamping connections.

The invention has therefore the object to provide a profile bar connection system of the aforementioned kind whose assembly is significantly simpler and can also be performed more reliably.

SUMMARY OF THE INVENTION

This object is solved for a profile bar connection system of the aforementioned kind in accordance with the present invention in that the first ends of the clamp halves are connected to each other with form fit and the second ends by means of the clamping device.

The gist of the invention resides in that, in comparison to the prior art, the connecting ends of the two clamp halves are utilized for the attachment of the second profile bar. It is therefore no longer required to first attach the two clamp halves by means of screw connections to the profile bar and to then attach subsequently the clamping device to an especially shaped damp half.

Though it is not mandatorily required to have the second ends form a first undercut projection in the joined state as there are many other possibilities; however, this special projection provided with undercuts is advantageous for the clamping connection.

In case the first ends of the half shells are also provided for attachment of a second profile bar, it is advantageous that the first ends in the joined state form a second undercut projection.

According to a further embodiment of the invention, it is provided that the clamping device is comprised of first and second half shells and comprises appropriate receptacles for frictional engagement or form-fit and frictional engagement of the joined second ends.

It is particularly advantageous when the joined first and second clamp halves have third and fourth undercut projections wherein all four projections are arranged at regular intervals. In this way, it is possible to use the first profile bar either as a corner bar, as a bar within an assembly, but also as a crossing point.

There are surely many kinds and shapes for connecting the appropriate ends with each other. It has been found to be especially simple, however, when the second end of the first clamp half has a second undercut projection that passes into a tongue that extends in the direction toward the second end of the second clamp half wherein the tongue engages underneath the second end of the second clamp half.

Should the first profile bar be a profile bar that forms at least a circular outer circumference, it is advantageous when the first and second clamp halves each have an enveloping angle that is greater than 180 degrees. In this way, it is ensured that the clamp halves that are placed at the appropriate desired position have a self-locking action even before attachment of the clamping member.

The same holds true however also for polygonal profiles namely in that the first and second clamp halves each have an enveloping length that is greater than half of the outer circumference of the profile bar.

When the end face of the clamping device that is facing the first profile bar is contacting adjacent to the undercuts of the second ends of the two clamp halves and in this way closes off the undercuts, then not only a positional securing action of the clamp halves is provided but the connecting location is also protected against penetration of dirt.

There are a plurality of manufacturing possibilities for these clamp halves; it has been found to be particularly advantageous when the clamp halves are extruded profiles.

BRIEF DESCRIPTION OF THE DRAWINGS

Further advantages and features of the invention result from the following description of several embodiments as well as from the Figures to which reference is being had. It is shown in.

DESCRIPTION OF PREFERRED EMBODIMENTS

With the aid of the FIGS. 1 to 7, several embodiments of a profile bar connection system 10 will be described in the following. It should be noted that same reference numerals indicate same, at least similar, features inasmuch as nothing else is stated.

All seven Figures show profile bar connection systems 10 for connecting at least two first and second profile bars 12 and 14 that extend approximately perpendicular to each other.

These profile bar connection systems 10 are comprised of first and second clamp halves 16 and 18 that at their first ends 16a and 18a as well as at their second ends 16b and 18b are connectable to each other.

In this context, the connection at the first two ends 16a and 18a is comprised of a form-fit connection. In contrast, the second ends 16b and 18b of the two clamp halves 16 and 18 are held together by a clamping device 20 and are thus connected also to each other.

An even better securing action is ensured when the second ends 16b and 18b in the joined state form a first undercut projection 22.

Though it is not mandatory, it is however advantageous when the first ends 16a and 18a in the joined state also form, in this case a second, undercut projection 24. In this way, the second projection 24 can also be engaged by clamping device 20 and can connect a further profile bar 14.

In all illustrated embodiments, the clamping device 20 is comprised of first and second half shells 26 and 28. At their end face areas that are facing the first projection 22, these two half shells 26 and 28 comprise appropriate first and second receptacles 26a and 28a in order to engage and join the approximately joined second ends 16b and 18b, in the illustrated case with form-fit and frictionally.

So that three or four second profile bars 14 can be connected at the same time, the joined first and second clamp halves 16 and 18 have third and fourth undercut projections 30 and 32. In this context, it is advantageous with respect to space considerations when all four projections 22, 24, 30, 32 are arranged at regular intervals on the clamp surface that is facing outwardly.

Now the special features are described with which the first and second ends 16a, 18a, 16b and 18b are configured in order to achieve the desired fastening action.

For this purpose, the first end 16a of the first clamp half 16 has a first nose 34 that is provided with an undercut in the direction toward the first clamp half 16. This nose 34 engages with form fit a cutout 36 that is provided at the first end 18a of the second clamp half 18.

As already briefly mentioned above, the second end 16b of the second clamp half 16 is provided with a second undercut nose 38. In this context, the undercut is also facing in the direction toward the first clamp half 16.

Moreover, the second end 16b of the first clamp half 16 has a tongue 40 that, beginning at the second undercut nose 38 extends in the direction toward the second end 18b of the second clamp half 18. This tongue 40 engages a recess 40a formed underneath the second end 18b of the second clamp half 18.

Figure 1:
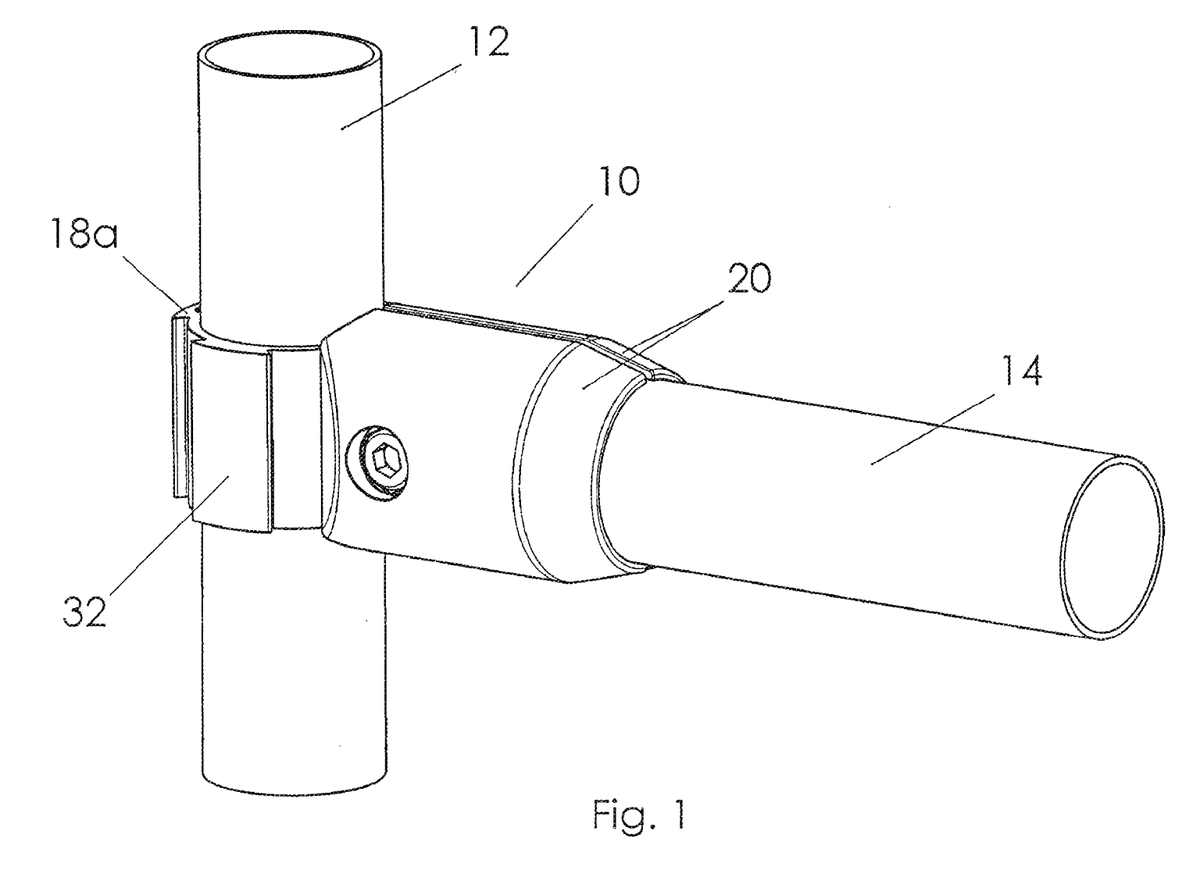
FIG. 1 a perspective illustration of an attached profile bar connection system.
Figure 2:
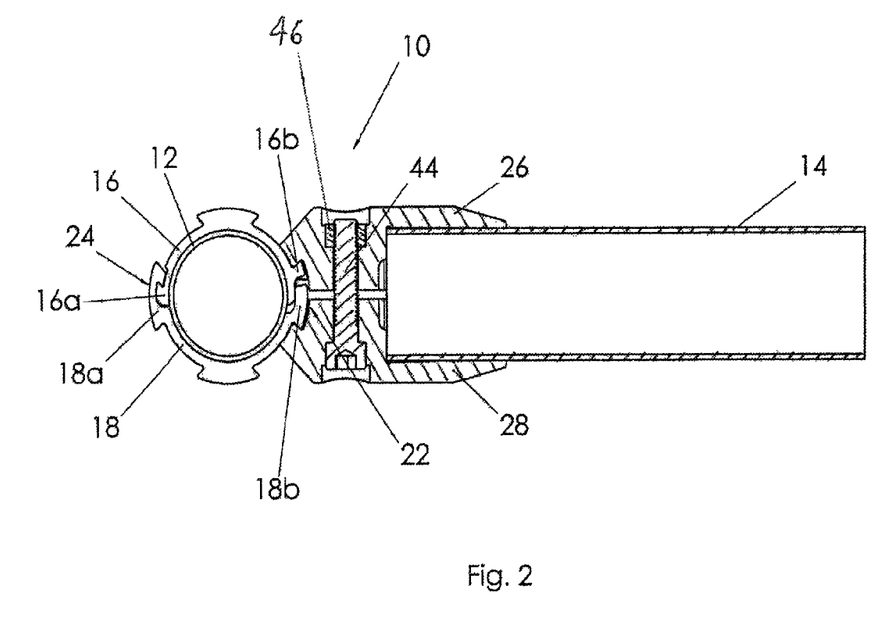
FIG. 2 a sectioned plan view of the profile bar connection system according to FIG. 1.
Figure 3:
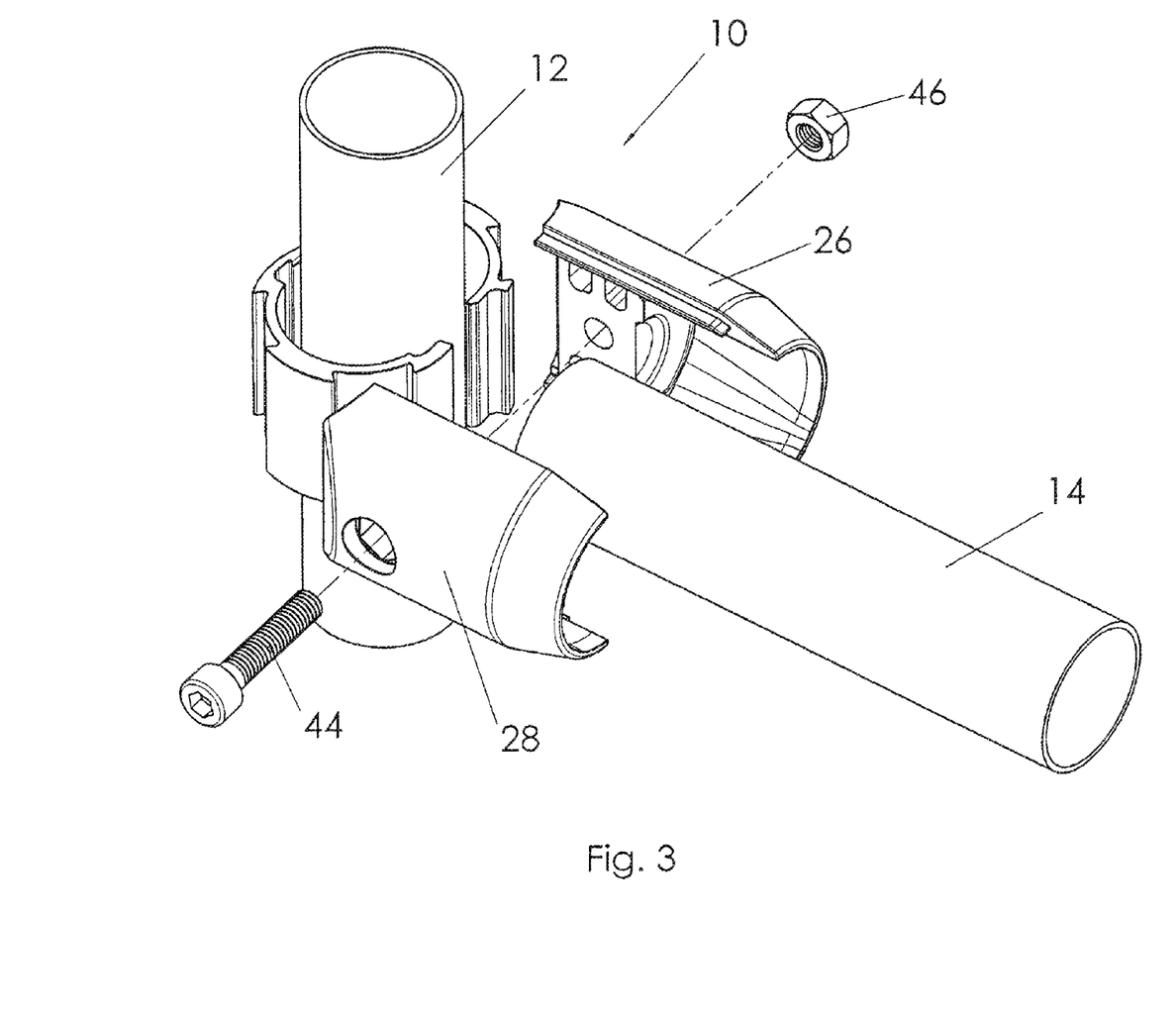
FIG. 3 a perspective exploded view of the profile bar connection system according to FIG. 1.
Figure 4:
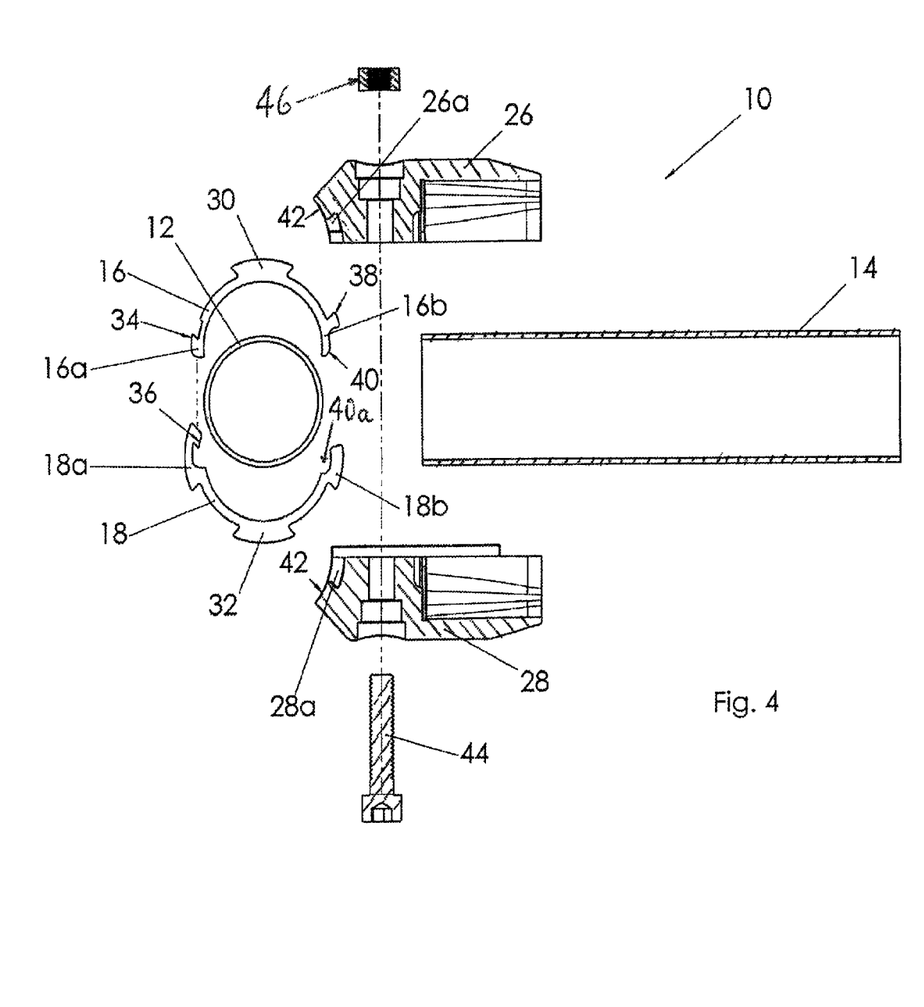
FIG. 4 a plan view onto the illustration of the profile bar connection system according to FIG. 3.

As can be seen in particular in FIG. 2, the second ends 16b and 18b of the first and second clamp halves 16 and 18 are not yet completely joined. These thus caused gaps then enable the clamping device 20 to compress this first undercut projection 22, in this case by means of a screw 44, until the required force exists. Of course, there should still be a very small gap between the two ends 16b and 18b in order to be able to compensate possible tolerances of the outer diameter of the first profile bars 12.

As can be seen in the Figures, the two half shells 26 and 28 of the clamping device 20 are also configured such that they secure the second profile bar 14 with clamping action, i.e., frictionally.

Moreover, the two half shells 26 and 28 are provided with stops for the end faces of the second profile bar 14 so that it cannot come into contact with the screw 44.

A special feature for a simple assembly resides in that the first and second clamp halves 16 and 18 each habe an enclosing angle that is greater than 180 degrees. In this way, the two clamp halves 16 and 18 can be positioned in a self-locking way at the desired position of the first profile bar 12 without having to hold them in position for further attachment of the second profile bar 14.

Even though not illustrated in the drawings, this also applies, of course, to angular profiles wherein then the enveloping length of the first two clamp halves 16 and 18 is longer than half of the outer circumference of the angular profile bar.

When the two clamp halves 16 and 18 have been attached at the desired position, the clamping device 20, whose two half shells 26 and 28 have been released by means of the screw 44 and its nut 46, can now be pushed across the second end 16b and 18b, respectively, of the first and second clamp halves 16 and 18. In this context, the opening of the engagement areas at the end face 42 of the clamping device 20 is opened so much that either perpendicular superimposing or a pressing action in perpendicular direction to the first profile bar 12 is possible.

Moreover, the end face 42 of the clamping device 20 that is facing the first profile bar 12 is contacting adjacent to the undercuts of the second end 16b and 18b of the two clamp halves 16 and 18 and can therefore close off the undercuts when the screw 44 is actuated. The contact has however a further advantage, namely that no dirt can penetrate here.

Moreover, in the illustrated embodiment the end face 42 of the clamping device 20 is further embodied such that several clamping devices with second profile bars 14 can be attached. In this case, for example, to the projections 24, 30 or also 32.

Figure 5:
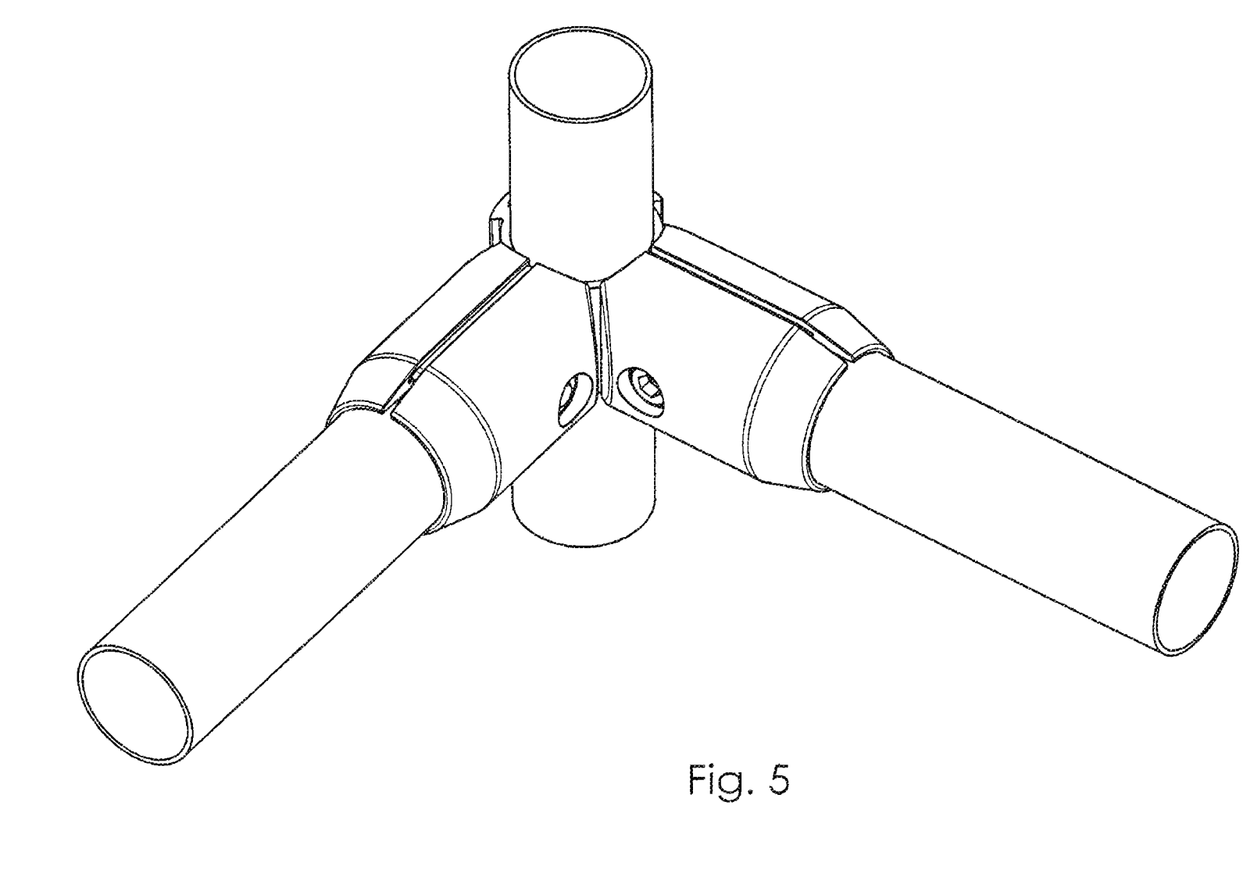
FIG. 5 a perspective illustration with two profile bars that are perpendicularly attached relative to each other.
Figure 6:
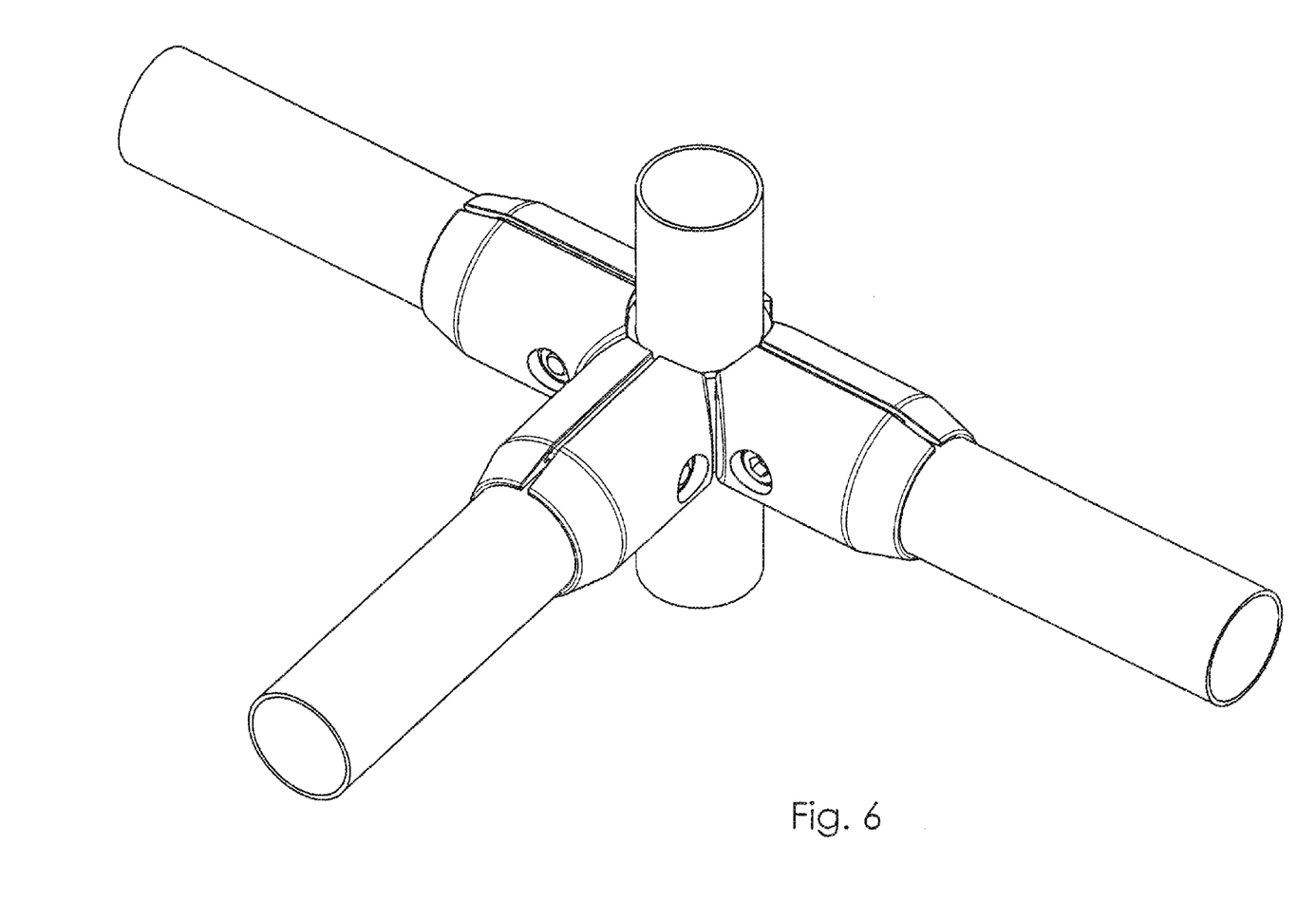
FIG. 6 a perspective illustration with three profile bar connection system connected to the first profile bar.
Figure 7:
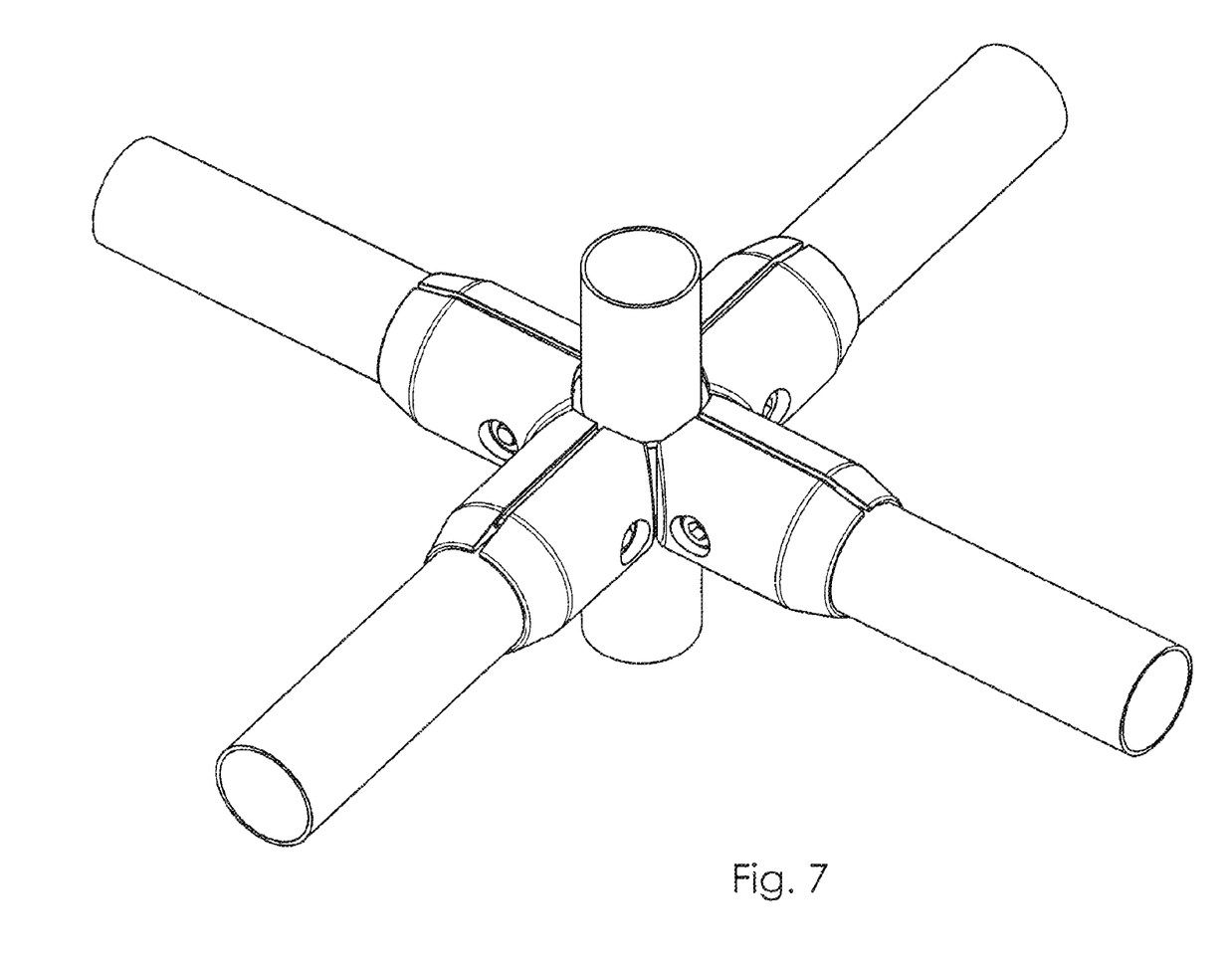
FIG. 7 a perspective illustration of a profile bar connection system with four connected profile bars.

These above described possibilities of attachment of two, three or four clamping devices 20 are illustrated in FIGS. 5 to 7 in perspective illustration.

Of course, there are a plurality of possibilities of producing these clamp halves. Preferred are extruded profiles as they have been disclosed in the description.

According to the invention, it is therefore possible to produce with technically simple means a frictional and also form-fitting connection of at least two, usually round, profile bars at a right angle to each other. Of course, this is also possible for round profiles with grooves and also for angular profiles.

LIST OF REFERENCE NUMERALS 10 profile bar connection system
12 first profile bar
14. second profile bar
16 first clamp half
16a,b first/second ends
18 second clamp half
18a,b first and second ends
20 clamping device
22 first undercut projection
24 second undercut projection
26 first half shell
26a first receptacle
28 second half shell
28a second receptacle
30 third undercut projection
32 forth undercut projection
34 first nose
36 cutout
38 second nose
40 tongue
42 end face
44 screw
46 nut

What is claimed is:

1. A profile bar connection system for connecting at least two first and second profile bars extending approximately perpendicularly to each other, the connection system comprising:

first and second clamp halves each having a first end and a second end, wherein the first and second clamp halves are secured to a first profile bar by a self-locking action when placed about the first profile bar, wherein the first and second clamp halves each have an enclosing angle of more than 180 degrees or an enclosing length that is greater than half of an outer circumference of the first profile bar, the enclosing angle or the enclosing length providing the self-locking action on the first profiled bar, and connected to each other at the first ends and the second ends in a joined state to join the first and second clamp halves;

a clamping device that is connectable to the first and second clamp halves when the first and second clamp halves are placed about the first profile bar, wherein the clamping device holds a second profile bar;

wherein the first ends are connected to each other in the joined state of the first ends with form fit;

wherein one of the second ends has a tongue and the other of the second ends has a recess;

wherein the second ends are connected to each other in the joined state of the second ends such that the tongue engages the recess and a gap remains between a tongue end of the tongue and the recess in a circumferential direction of the joined first and second clamp halves, the gap allowing relative movement of the second ends toward each other in the circumferential direction;

wherein the clamping device when tightened compresses the second ends toward each other;

wherein the first end of the first clamp half has a first nose provided in the direction toward the first clamp half with an undercut, wherein the first nose engages a matching cutout provided at the first end of the second clamp half;

wherein the second end of the first clamp half has a second nose provided with an undercut, wherein the second end of the first clamp half is provided with the tongue that engages the recess that is formed on and extends on a radial inner side of the second end of the second clamp half.

2. The connection system according to claim 1, wherein the second ends in the joined state of the second ends form a first undercut projection.

3. The connection system according to claim 2, wherein the first ends in the joined state of the first ends form a second undercut projection.

4. The connection system according to claim 1, wherein the clamping device is comprised of first and second half shells and comprises receptacles for frictional engagement or form-fit and frictional engagement of the second ends in the joined state of the second ends.

5. The connection system according to claim 3, wherein the joined first and second clamp halves are provided with third and fourth undercut projections, wherein the first, second, third, and fourth projections are arranged at regular intervals about a circumference of the joined first and second clamp halves.

6. The connection system according to claim 1, wherein the clamping device has end faces facing the first profile bar, wherein the end faces are contacting the first and second clamp halves adjacent to undercuts of the second ends of the first and second clamp halves and close off the undercuts.

7. The connection system according to claim 1, wherein the clamp halves are extruded profiles.

* * * * *